United States Patent
Dwyer, III et al.

[19]

[11] Patent Number: 5,871,160
[45] Date of Patent: Feb. 16, 1999

[54] APPARATUS AND ASSOCIATED METHOD FOR DERFIBERING PAPER OR DRY PULP

[76] Inventors: Edward J. Dwyer, III, 5 Thistle Ct., New Hartford, N.Y. 13413; Stuart E. Sandford, LX19 Conc 8, Drummond Township Ontario, Canada, K7C3P5; Robert E. Boudria, 1112 Des Cerisier Street, Rockland, Ontario, Canada, K4K1K9; Robert G. Wray, 7 Lovers Court, Barrie, Ontario, Canada, L4N7W8

[21] Appl. No.: 791,991

[22] Filed: Jan. 31, 1997

[51] Int. Cl.[6] .................................................. B02C 19/06
[52] U.S. Cl. .................................. 241/5; 241/39; 241/80; 241/52
[58] Field of Search .......................... 241/24.19, 5, 39, 241/1, 301, 49, 52, 97, 80, 28, 18, 21, 57

[56] References Cited

U.S. PATENT DOCUMENTS

| | | |
|---|---|---|
| 3,599,293 | 8/1971 | Nystrand et al. . |
| 3,644,170 | 2/1972 | Mekata et al. ............................ 241/5 |
| 3,741,485 | 6/1973 | Gage et al. .............................. 241/5 |
| 3,773,613 | 11/1973 | Lee et al. . |
| 3,967,785 | 7/1976 | Grosch . |
| 3,993,252 | 11/1976 | Ito et al. ............................ 241/24.19 |
| 4,065,347 | 12/1977 | Aberg et al. . |
| 4,123,317 | 10/1978 | Fritzvold et al. . |
| 4,191,335 | 3/1980 | Cavagna . |
| 4,834,299 | 5/1989 | Kishibata et al. ........................ 241/5 |
| 4,919,340 | 4/1990 | Gerber .................................... 241/5 |
| 5,102,055 | 4/1992 | Buschmann et al. ..................... 241/5 |
| 5,188,298 | 2/1993 | Gerber .................................... 241/5 |
| 5,277,371 | 1/1994 | Bowns et al. . |
| 5,324,389 | 6/1994 | Spencer . |
| 5,344,595 | 9/1994 | Aoki et al. . |
| 5,387,385 | 2/1995 | Murji et al. . |

FOREIGN PATENT DOCUMENTS

| | | | |
|---|---|---|---|
| 488637 | 6/1992 | European Pat. Off. ................. 241/5 |
| 89531 | 7/1957 | Norway .................................. 241/5 |
| 1416575 | 8/1988 | U.S.S.R. ................................. 241/5 |

*Primary Examiner*—Mark Rosenbaum
*Attorney, Agent, or Firm*—Sheridan Ross P.C.

[57] ABSTRACT

An apparatus and method for defibering paper and dry pulp in a substantially dry processing environment is disclosed. The apparatus and method for defibering paper and dry pulp uses a dry processing cell into which cellulose material is supplied. The dry processing cell includes a rotating element for creating a turbulent air flow within the cell. The turbulent air flow causes the cellulose material to be circulated within the dry processing cell and to collide with the rotating element, cell walls, and the cellulose matter, itself. This circulation causes disassociation of the cellulose material from the filler, inks and other materials into single cellulose fibers that are capable of being removed from the cell for further processing.

23 Claims, 2 Drawing Sheets

APPARATUS AND ASSOCIATED METHOD FOR DERFIBERING PAPER OR DRY PULP

FIELD OF THE INVENTION

The present invention relates generally to defibering paper and/or dry pulp. More particularly, the present invention relates to an apparatus and method for defibering paper and/or dry pulp in a substantially dry environment by creating a turbulent air flow within a processing chamber.

BACKGROUND OF THE INVENTION

Various types of defibering systems for paper and pulp processing are known. Typically, in these systems, cellulose fiber, in the form of dry pulp sheets or paper, is added to large volumes of water and continuously agitated during the defibering and pulping process. In these known systems, complete defibering of dry pulp sheets or clean recycle paper fiber sheets involves high process times, high energy consumption and large volumes of water.

Generally, in the present known defibering systems, the use of a wet process environment necessitates hydraulic processing where the process water contains 4 to 16% solid matter. In this wet environment, contaminants from the cellulose material mix with the process water and impede disassociation of the cellulose fibers. Furthermore, removal of the contaminants from the process water can create environmental hazards and effluent treatment problems.

In addition, the wet defibering and pulping processes are unable to recover many grades of paper for recycling because the paper may be resistant to the process water or cause other problems associated with the wet environment processing. As a result, many grades of paper that are difficult, expensive or incapable of being processed in a wet environment are disposed of in landfills or used in non-paper related end products, such as animal bedding.

For example, paper containing wet strength is manufactured to provide durability for long term weatherproof use in contact with moisture. As a result, wet strength paper is difficult to defiber and can cause block screens and pumps used in defibering the paper in wet pulp processing systems and are, typically, disposed of in landfills. Similarly, paper containing internal or surface latex is resistant to moisture and is virtually impossible to defiber using a wet environment. Currently, these latex paper products are not easily or economically recyclable using wet pulp processing systems.

In addition, biochemical oxygen demand (BOD) generating materials, such as starch, are added to most grades of paper to provide surface characteristics on the paper sheet to allow for clear printing and assist the bonding of the filler and cellulose. These materials are proportionally present in the effluent stream causing regulatory problems and creating a negative environmental impact on receiving stream quality. Since the presence of BOD generating materials in wet pulp processes creates significant environmental and effluent problems, government regulations have been introduced to reduce BOD content in waste streams. Therefore, due to these strict government regulations, the recycling of paper containing BOD generating materials in wet pulp processes may be reduced.

In present wet pulp processes, paper containing laser or toner type inks reduce brightness to the pulp or paper product and generally result in a high dirt count rendering the final product unacceptable. As the use of laser and toner type ink increases, recycling mills using wet pulp processing systems will be unable to maintain the quality of the final product. As a result, wet pulp processes designed to remove laser or toner inks will produce high volume waste streams that will increase cost and cause environmental hazards. In addition, paper containing high filler levels cause processing problems for some wet pulp processing systems. A high filler level can interfere with flotation, bleaching or screening of the wet fiber stock and, therefore, increase the erosion and abrasion on the process elements resulting in increased processing costs.

Therefore, there is a significant need for an improved method and device for addressing the operating problems that occur in wet pulping processes. This need intensifies as paper products that resist moisture are used, and as the government more stringently regulates the content of waste streams and effluent from paper processing mills.

SUMMARY OF THE INVENTION

Accordingly, it is an object of the present invention to provide a paper and dry pulp fibering apparatus and method that is capable of defibering cellulose material in a substantially dry environment and to liberate single cellulose fibers without creating an environmental waste hazard.

It is another objective of the present invention to provide a paper and dry pulp defibering apparatus and method that is capable of liberating single cellulose fibers from many types of paper products including products that are resistant to moisture.

It is yet another objective of the present invention to provide a paper and dry pulp defibering apparatus and method that is capable of defibering cellulose material in a relatively small amount of time using a fairly low energy consumption.

In one aspect of the present invention a dry processing cell is provided for defibering paper and dry pulp. The dry processing cell includes a containment vessel that is substantially closed. The exterior of the containment vessel can be substantially cubic while the interior of the containment vessel can be, in another embodiment, octagonal in shape. Baffles protrude from the interior walls and into the interior portion of the dry processing cell to disrupt an air flow created within the dry processing cell. A turbulent air flow is created within the dry processing cell by a rotating element that rotates at a high angular velocity (revolutions per second). The turbulent air flow creates an aerodynamic vortex that circulates the cellulose material within the cell until it is reduced to single cellulose fibers. The dry processing cell also contains exit ports that either screen the single cellulose fibers for further processing or recirculate unprocessed cellulose material to the dry processing cell for continued defibering. This turbulent air flow is capable of reducing the cellulose material to single cellulose fibers, including paper products that are resistant to moisture. In addition, the turbulent air flow created within the processing cell processes the cellulose material in less time than wet processing environments, and therefore less energy is consumed by the dry processing system. Finally, the turbulent air flow disassociates the cellulose material into single fibers without creating the environmental hazards previously mentioned.

In another aspect of the present invention, a method for defibering paper and dry pulp includes supplying dry cellulose material into the dry processing cell using a circulation blower. As the cellulose material enters the dry processing cell, it encounters an aerodynamic vortex that is created by a rotating element. The cellulose material is circulated within the dry processing cell and is caused to impact the rotating element, the cell walls and baffles, and other cellulose material within the cell. This circulation disassociates the cellulose material into single cellulose fibers and causes inks, fillers and other materials to become liberated from the fibers.

Once the cellulose material has been disassociated into single cellulose fibers, the single fibers are ejected from the processing cell through an accepts screen. The material ejected from the processing cell contains both single fibers and some micronized contaminants, such as inks, filler, starches, and latex.

The single fibers are separated from the micronized contaminants in two separate stages. The first stage separates the single fibers from the micronized contaminants in a modified cyclone by using the difference in aerodynamic nature of the materials. In the second stage, any residual contaminants that are not removed by the modified cyclone are removed on a vibrating screen conveyor. After this separation, the single cellulose fibers are screened and bagged for storage or sent to a pulper for further processing.

DETAILED DESCRIPTION

Figure 1:
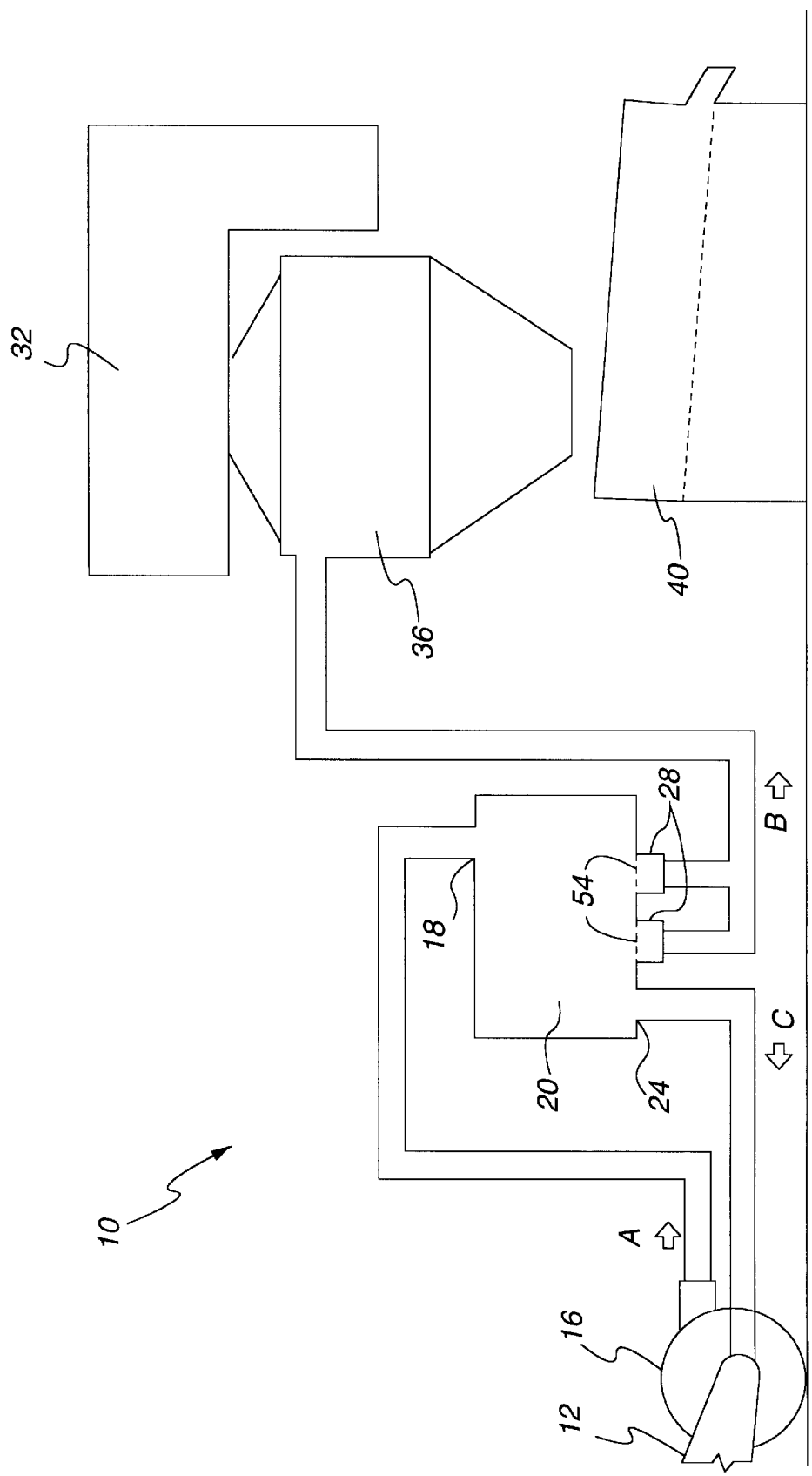
FIG. 1 illustrates one embodiment of a dry processing system of the present invention.

The present invention will be described in relation to the accompanying drawings which assist in the illustration of its various pertinent features. Referring initially to FIG. 1, a paper and dry pulp defibering system 10 includes a material feeder 12 and a circulation blower 16 for providing cellulose material and air flow to the system 10. The cellulose material is moved in the direction of arrow A to the dry processing cell 20 via a material inlet 18. In the dry processing cell 20, the cellulose material is substantially reduced to single cellulose fibers which are filtered through accepts screens 54 to the accept outlets 28 and are moved in the direction of arrow B. Any cellulose material that has not been reduced to single fibers exits the dry processing cell 20 through the recirculation outlet 24 and is directed in the direction of arrow C to the circulation blower 16 which recirculates the material through the system. Large contaminants, such as plastics or tape, are trapped inside the processing cell 20. These material remain in the areas of relatively low turbulence within the processing cell 20 and are removed using a trash trap or other means (not shown in this embodiment). The single cellulose fibers are directed to a cyclone 36 where they are separated from waste material, such as fillers, inks, BOD generating materials and unusable cellulose materials. The waste material is collected in the bag house filter 32 for disposal. The single cellulose fibers fall out the bottom of the cyclone 36 and are deposited on a vibrating screen conveyor 40 where a screening process removes any excess inks that were not removed during the previous processing.

More particularly, referring to FIG. 1, the paper and dry pulp defibering system 10 will be described in further detail. Raw cellulose in dry sheet paper or dry pulp form is reduced in size using a paper shredder or hog (not shown in FIG. 1) and fed in either continuous or batch amounts to the material feeder 12. The cellulose material may, for example, be in the form of dry pulp sheets, printed paper, wet strength paper, latex coated paper, mill broke, polycoated paper or latex saturated paper. In a preferred embodiment, the paper shredder or hog reduced the size of the dry sheet paper and pulp to a width of 61 centimeters and a length of 61 centimeters, or less. The cellulose material from the shredder hog is supplied to the material feeder 12 where it can be combined with recirculated cellulose rejected from the dry processing cell 20. The circulation blower 16 is capable of combining the recirculated cellulose and the raw cellulose from the paper shredder with air and moves the cellulose in the direction of arrow A to the dry processing cell 20. The material feeder 12 and the circulation blower 16 work in combination to provide a balanced air flow in the process system 10 so as to convey the cellulose material mechanically and pneumatically to the top material inlet 18 of the dry processing cell 20.

Figure 2:
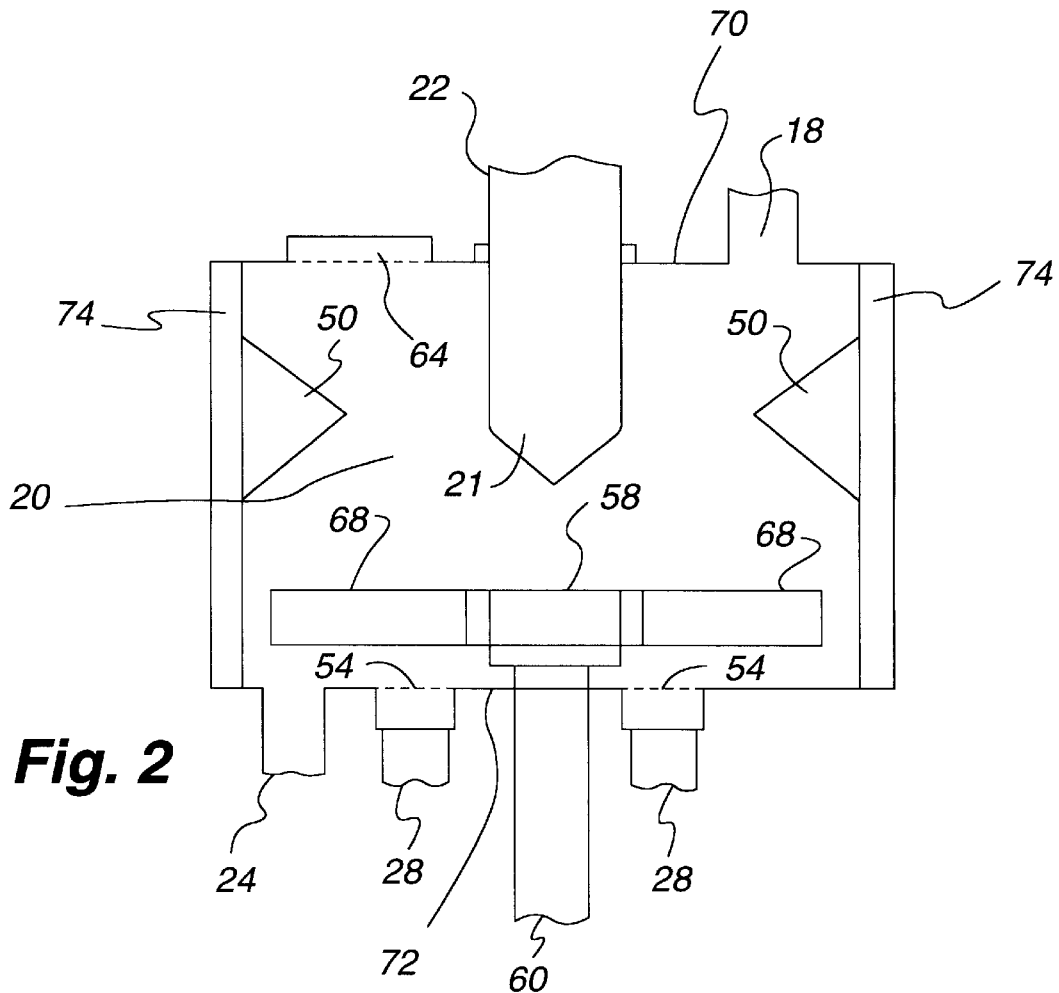
FIG. 2 illustrates a cross sectional view of one embodiment of a dry processing cell of the present invention.
Figure 3:
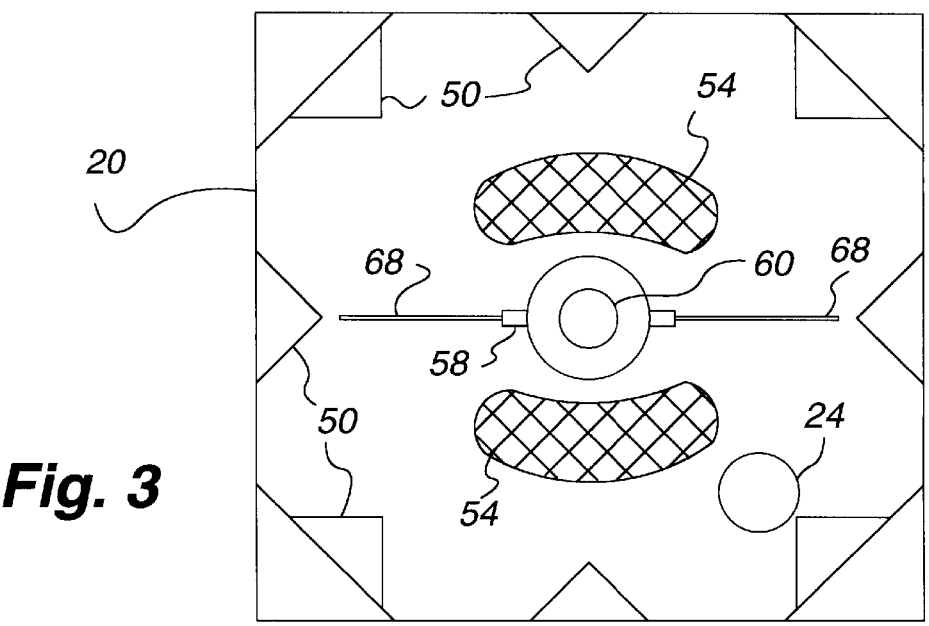
FIG. 3 illustrates a top view of one embodiment of the dry processing cell of the present invention.

When the cellulose material is introduced into the dry processing cell 20, it falls into a controlled turbulent air flow that directs the cellulose material toward a rotating element 58. Referring to FIGS. 2 and 3, the cellulose material enters the dry processing cell 20 via the material inlet 18. The highly turbulent air flow is created by a rotating element 58, driven by drive shaft 60. The turbulent air flow is created by rotating the blades 68 of the rotating element 58 at an angular velocity ranging from 500 to 5000 revolutions per second, for example. The rotation of the rotating element 58 within the substantially closed dry processing cell 20 creates an aerodynamic vortex. In one embodiment, the rotating element 58 is shown, having two blades 68. It should be appreciated that the rotating element 56 can have four or six blades that rotate to efficiently create the turbulent air flow.

As shown in FIG. 2, the dry processing cell 20 is composed of a top portion 70, a bottom portion 72 and a sidewall portion 74. Furthermore, in FIGS. 2 and 3, the rotating element 58 is mounted at the bottom portion 72 of the dry processing cell 20, in another embodiment, the rotating element may be mounted at the top of the dry processing cell 20. Moreover, in yet another embodiment, any means may be employed to create the turbulent controlled air flow, such as piping air into the dry processing cell 20 from an external blower.

The energy and air flow created in the dry processing cell 20 can create a drying effect on the cellulose material and static electricity within the dry processing cell. To counteract these problems, sprinklers 64 can be added to the dry processing cell to mix water or other viscous fluids with the cellulose material. Generally, the moisture level introduced into the dry processing cell 20 from the sprinklers 64 ranges from 5 to 15% which leaves 85 to 95% solid material in the processing cell 20. Furthermore, it should be noted that the typical moisture level within paper products ranges between 5 to 15%. Therefore, the introduction of moisture into the dry processing cell 20 is to counteract the problems mentioned above and not to create a liquid processing environment.

The turbulence in air flow created by rotation of the blades 68 is enhanced by the presence of designed wall formations such as wall baffles 50 in the form of an L-shaped protrusion. In one embodiment, the wall baffles 50 may be fabricated in the walls of the dry processing cell 20. For example, in one embodiment the dry processing cell 20 can have an exterior wall surface that is essentially rectangular while the interior wall surface can be octagonal in shape with various baffles 50 extending into the interior portion of the dry processing cell 20. Typically, the wall baffles 50 cover about one-half of the sidewall portion 74 of the dry processing cell 20. It should be appreciated that the dimensions of the wall baffles may vary according to the dimensions of the sidewall portions 74 of interior of the dry processing cell 20. For example, in one embodiment, a dry processing cell having a sidewall portion area of 1.2 meters by 1.2 meters may have a wall baffle portion area that covers 0.6 meters by 0.6 meters of the sidewall portion area.

In an alternative embodiment, the dry processing cell 20 is essentially cubic and the wall baffles 50 can be formed in wall inserts that are removably inserted within the dry processing cell 20. In a preferred embodiment, the baffles 50 can be formed within the dry processing cell 20 by using two wall inserts. The first insert creates a non-uniform octagon within the dry processing cell 20, and the second insert creates wall baffles that protrude into the dry processing cell 20, as shown in FIG. 3. In yet another embodiment, the dry processing cell 20 may be have the sidewall portions 74 that are circularly shaped, and removable inserts may be used to define the interior portion of the dry processing cell 20 to introduce turbulence in the air flow circulation within the dry processing 20. In an alternative embodiment, a center baffle 21 that is independent from the walls of the dry processing cell 20 can be used to create turbulence in the air flow. In this regard, the center baffle 21 is capable of being suspended within the interior portion of the dry processing cell 20 by a support means 22 that is external to the dry processing cell 20.

By extending into the interior portion of the dry processing cell, the baffles 20 are used to disrupt the laminar air flow created by the rotating element 58 and to create an aerodynamic vortex into which the cellulose material is introduced. As such, the turbulent air flow created in the dry processing cell 20 by the rotating element 58 and the baffles 20 produces a scrubbing effect on the cellulose material that is capable of separating the material into single cellulose fibers. The scrubbing effect created within the dry processing cell 20 by the rotating element 58 is so intense that natural and synthetic mat-to-fiber binders, that are virtually impossible to liberate from the cellulose material in a wet processing environment, are capable of being dispersed using the present invention. As shown in the embodiment in FIG. 2, the cellulose material falls by gravity and directed air flow from the material inlet 18 into the dry processing cell 20 and is directed by air flow into the aerodynamic vortex created by the rotating element 58. The blades 68 further reduce the size of the cellulose material and propel it toward the walls of the dry processing cell 20.

The size and shape of the dry processing cell 20 disrupts the rotation of the aerodynamic vortex and creates an area of high pressure at the cell walls and therefore caused the cellulose material to move upward. The cellulose material impacts the baffles 50 and the walls of the dry processing cell 20 as it is forced outward from the rotating element 58 and upward to the top of the dry processing cell 20. In addition to impacting the cell walls and baffles 50, the cellulose material collides with itself to aid in separation of the individual cellulose fibers. These high pressure zones, the low specific gravity of a single cellulose fiber and the poor aerodynamic shape of the single cellulose fiber reduce the ability of the single cellulose fibers to excessively impact the cell walls and become over processed. As such, the dry cell processing of the cellulose, in the present invention, allows the cellulose fibers to remain substantially intact and, therefore, maintain the fiber length and significantly reduce the number of destroyed fibrils.

As the cellulose material is circulated up the cell walls by the high pressure zones created within the dry processing chamber 20, it encounters an area of lower turbulence and the low pressure created in the center of the dry processing cell by the rotating element 58, and the cellulose material is drawn back into the rotating element 58. Again, the cellulose material impacts and is influenced by the rotating element 58. The circulation of cellulose material within the dry processing cell 20 caused by the rotating element 58 and the wall baffles 50 causes single cellulose fibers, filler and contaminants to disassociate. This process of circulating the cellulose material is performed repeatedly until a substantial amount of the cellulose material is reduced to single cellulose fibers. As the single cellulose fibers are separated from the fiber sheets, they are removed from the processing cell 20 by being filtered through the accepts screens 54 or recirculated through the recirculation outlet 24 and returned to the dry processing cell 20 for further processing or filtering through the accepts screens 54. The typical processing time for substantial defiberization of the cellulose material in the dry processing cell 20 is from 0.15 to 3 minutes compared to 0.5 to 2 hours in typical wet pulping processes.

The partially processed material and undispersed fiber bundles can be drawn out of the processing cell 20 through the recirculation outlet 24 toward the circulation blower 16 in the direction of arrow C, as shown in FIG. 1. In a preferred embodiment, the dry processing cell 20 contains one recirculation outlet 28, but it should be appreciated that more than one recirculation outlet can be added to the processing cell for recirculation purposes. The cellulose material removed from the dry processing cell 20 is circulated to the circulation blower 16 and recirculated to the material inlet 18 of the dry processing cell 20. During recirculation, the partially processed cellulose material may be mixed with unprocessed cellulose material from the material feeder 12 before it is reintroduced into the dry processing cell 20.

The single cellulose fibers and light non-cellulose materials that are liberated during the processing remain airborne and are forced through the accepts screens 54 located below the rotating element 58. In a preferred embodiment, the accepts screens 54 are located in the bottom portion 72 of the dry processing cell 20 directly below and within about 10 centimeters of the rotating element. Typically, the accepts screens 54 occupy 20% of the area of the bottom portion 72 of the dry processing cell 20, and the accepts screens 54 are crescent shaped to mirror the arc of the rotating element 54. This spacial positioning greatly decreases the tendency of binding the accepts screens 54 because the sweeping action of the rotating element 58 cause the single cellulose fibers to be filter through the accepts screens with every one-half turn of the rotating element 58. The air flow at the accepts screens 54 directs the single cellulose fibers and light non-cellulose materials through the screens 54 and out of the dry processing cell 20 in the direction or arrow B, to the cyclone 36. The accepts screens 54 are used as critical quality control devices because they cause the cellulose material to reside within the dry processing cell 20 until it is fully processed into the single cellulose fibers and prevent undispersed fiber bundles from entering the finished single fiber stream.

In addition to creating an air flow within the dry processing cell 20, the rotating element 58 along with the addition of aerated cellulose material from the material inlet 18 create a positive pressurization within the dry processing cell 20. More specifically during operation, the pressure in the interior portion of the dry processing cell 20 can be higher than the pressure that is external to the dry processing cell 20. Therefore, this pressurization within the dry processing cell 20 creates an area of lower pressure at the accepts screens 54. This pressure gradient at the accepts screens 54 assists in the filtering of the cellulose material through the accepts screens 54 and, therefore, removing the single cellulose fibers from the dry processing cell 20.

Referring again to FIG. 1, the single cellulose fibers and other material that are removed from the dry processing cell 20 through the accepts screens 54 are directed to the cyclone 36 which uses an air rotation to create a centrifugal force to substantially separate the single cellulose fibers from the non-cellulose material using the difference in aerodynamic nature of the materials. In the cyclone 36, substantially all of the single cellulose fibers are forced out the bottom of the cyclone due to gravity onto a vibrating screen conveyor 40. Substantial portions of the non-cellulose material, such as fillers, inks, and BOD generated material, are directed to the reject side of the cyclone to the bag house filter for disposal or reuse.

The single cellulose fibers from the cyclone 36 are fed onto the vibrating screen conveyor 40 to any residual remove laser and toner inks and usable cellulose fiber that were not separated by the cyclone 36. These inks and unusable cellulose fibers become disassociated and unattached to the single cellulose fiber during the dry processing, but due to their similarity in specific gravity to the single cellulose fibers, they tend to follow the single cellulose fibers through the dry processing cell 20 and the cyclone 36. As such, the vibrating screen conveyor 40 is capable of separating the single cellulose fibers from inks and unusable cellulose fibers because they are smaller in size than the single cellulose fibers. In addition, it should be appreciated that alternate embodiments may employ any type of screening process to separate the single cellulose fibers from the inks and unusable cellulose fibers after processing by the cyclone 36.

After the single cellulose fibers are processed on the vibrating screen conveyor 40, they are bagged for storage or delivered to a pulper for further processing. The screened inks and unusable cellulose fibers are collected below the vibrating screen conveyor 40 for disposal.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. An apparatus for defibering paper and dry pulp comprising:

a containment means for housing cellulose material wherein contents of said containment means have a total moisture content ranging from about 5 to about 15%, said containment means having a sidewall portion connected to a top portion and a bottom portion;

at least one inlet port in said containment means for introducing a flow of said cellulose material into said containment means;

means for creating an air flow within said containment means, wherein said means for creating an air flow and said air flow generated by said means for creating substantially disassociates said cellulose material into individual cellulose fibers;

at least one filtered exit port in said containment means having a filter means for separating and removing said individual cellulose fibers from said containment means; and at least one designed wall formation connected to an interior surface of said sidewall portion of said containment means for extending into an interior portion of said containment means for creating turbulence in said air flow.

2. An apparatus, as claimed in claim 1, wherein said containment means is substantially enclosed. interior portion of said containment means for creating turbulence in said air flow.

3. An apparatus, as claimed in claim 1, wherein said designed wall formation comprises a baffle.

4. An apparatus, as claimed in claim 1, further comprising means for adding a viscous fluid into said containment means, said viscous fluid being provided for moisturizing said cellulose material.

5. An apparatus, as claimed in claim 1, wherein said sidewall portion of said containment means comprises an exterior wall surface and interior wall surface, said exterior wall surface being substantially rectangular and said interior wall surface being substantially octagonal.

6. An apparatus, as claimed in claim 5, wherein said interior wall surface of said containment means further comprises at least one designed wall formation for redirecting said air flow within said containing means.

7. An apparatus, as claimed in claim 1, wherein said sidewall portion is substantially circular.

8. An apparatus, as claimed in claim 1, wherein said means for creating a turbulent air flow comprises at least one rotating element located within said containing means.

9. An apparatus, as claimed in claim 8, wherein said at least said one rotating element comprises at least one rotatable blade.

10. An apparatus, as claimed in claim 1, wherein said containment means further comprises:

at least one unfiltered exit port for removing said unprocessed cellulose material for recirculation to said containment means.

11. An apparatus, as claimed in claim 1, wherein said means for creating an air flow is located adjacent to said bottom portion of said containment means, said at least one filtered exit port being located below and within about 10 centimeters of said means for creating an air flow.

12. An apparatus, as claimed in claim 1, wherein said at least one exit port is located in said bottom portion of said containment means, said first exit port occupying about 20% of an area of said bottom portion of said containment means.

13. An apparatus, as claimed in claim 10, wherein said containing means further comprises a second inlet port for reintroducing air and unprocessed cellulose material into said containing means.

14. An apparatus, as claimed in claim 1, wherein said flow of cellulose material and said means for creating an air flow create a positive pressurization within said containment means.

15. An apparatus, as claimed in claim 1, wherein said at least one exit port is located below and within about 10 centimeters of said means for creating an air flow.

16. An apparatus, as claimed in claim 1, further comprising a center baffle independent from said containment means, said center baffle being suspended within said containment means connected to a support means exterior to said containment means for creating turbulence in said air flow.

17. An apparatus, as claimed in claim 1, further comprising at least one wall formation insert being removably inserted within said containment means, said at least one wall formation insert defining interior dimensions of said containment means.

18. An apparatus, as claimed in claim 17, wherein said at least one wall formation insert contains at least one baffle for extending into an interior portion of said containment means for creating turbulence in said air flow sufficient to substantially disassociate said cellulose material into individual cellulose fibers.

19. A method for defibering paper and dry pulp, comprising the steps of:

depositing cellulose material into a containment means wherein contents of said containment means have a total moisture content ranging from about 5 to 15%; and creating an air flow within said containment means for disassociating said cellulose material into individual cellulose fibers, wherein said air flow aerodynamically suspends said individual cellulose fibers and non-cellulose material according to the aerodynamic nature and specific gravity of said fibers and said non-cellulose material.

20. The method according to claim 19, further comprising a step of introducing a viscous liquid into said containment means for moisturizing said cellulose material.

21. The method, according to claim 17, further comprising the steps of:

removing unprocessed cellulose material from said containment means; and recirculating said unprocessed cellulose material into said containment means for further processing.

22. The method according to claim 17, further comprising the step of reducing cellulose material size.

23. The method, as claimed in claim 17, further comprising the step of separating said individual cellulose fibers from non-cellulose material.

* * * * *